United States Patent
Shankar et al.

(10) Patent No.: US 10,678,578 B2
(45) Date of Patent: Jun. 9, 2020

(54) SYSTEMS AND METHODS FOR LIVE MIGRATION OF A VIRTUAL MACHINE BASED ON HEAT MAP AND ACCESS PATTERN

(71) Applicant: Microsoft Technology Licensing, LLC, Redmond, WA (US)

(72) Inventors: Vinod R. Shankar, Woodinville, WA (US); Vladimir Petter, Bellevue, WA (US); Vyacheslav Kuznetsov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/199,228

(22) Filed: Jun. 30, 2016

(65) Prior Publication Data
US 2018/0004560 A1   Jan. 4, 2018

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4856* (2013.01); *G06F 9/5072* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 7,484,208 | B1* | 1/2009 | Nelson | G06F 9/45558 |
| | | | | 718/1 |
| 7,500,051 | B2 | 3/2009 | Recio et al. | |
| 7,831,773 | B2* | 11/2010 | Zedlewski | G06F 11/3409 |
| | | | | 711/130 |
| 7,975,108 | B1* | 7/2011 | Holscher | G06F 12/0862 |
| | | | | 711/118 |

(Continued)

OTHER PUBLICATIONS

Elmore, et al., "Zephyr: Live Migration in Shared Nothing Databases for Elastic Cloud Platforms", In Proceedings of the ACM SIGMOD International Conference on Management of data, Jun. 12, 2011, 12 pages.

(Continued)

*Primary Examiner* — Abu Zar Ghaffari

(57) ABSTRACT

Systems and methods for live migration of VMs between different nodes are provided. The system and methods utilize a heat map and an access pattern to determine the fetching order of files and/or blocks from the cache of a host node for rebuilding the cache on a destination node. The systems and methods are able to persist the cache of a host node across a crash, allowing a destination node to fetch blocks and/or files from the cache on the host node after a crash instead of having to access the VM files and/or blocks from an original source. Accordingly, the systems and methods decrease migration latency of the VM and free up network bandwidth during the live migration when compared to prior systems and methods that utilize just the heat map to determine the fetching order and/or that are not able to persist the cache across a crash.

20 Claims, 9 Drawing Sheets

(56) References Cited

U.S. PATENT DOCUMENTS

| | | | | |
|---|---|---|---|---|
| 8,429,651 | B2* | 4/2013 | Donnellan | G06F 9/45558 |
| | | | | 718/1 |
| 8,468,289 | B2* | 6/2013 | Hepkin | G06F 9/45558 |
| | | | | 711/6 |
| 8,805,951 | B1 | 8/2014 | Faibish et al. | |
| 8,930,947 | B1 | 1/2015 | Derbeko et al. | |
| 9,055,119 | B2 | 6/2015 | Zhou et al. | |
| 9,076,012 | B2 | 7/2015 | George et al. | |
| 9,116,812 | B2 | 8/2015 | Joshi et al. | |
| 9,176,980 | B2* | 11/2015 | Ananthanarayanan | |
| | | | | G06F 16/1858 |
| 9,213,706 | B2* | 12/2015 | Long | G06F 11/1469 |
| 9,223,706 | B2* | 12/2015 | Penner | G06F 12/0862 |
| 9,274,958 | B1 | 3/2016 | Korotaev et al. | |
| 9,354,918 | B2* | 5/2016 | Gupta | H04L 67/34 |
| 9,613,064 | B1* | 4/2017 | Chou | G06F 17/30289 |
| 9,977,738 | B2* | 5/2018 | Venkatasubramanian | |
| | | | | G06F 9/5033 |
| 10,318,325 | B2* | 6/2019 | Chambliss | G06F 9/45558 |
| 2006/0010227 | A1* | 1/2006 | Atluri | G06F 11/1453 |
| | | | | 709/217 |
| 2009/0160859 | A1* | 6/2009 | Horowitz | G06T 11/206 |
| | | | | 345/440 |
| 2009/0300604 | A1* | 12/2009 | Barringer | G06F 11/3664 |
| | | | | 717/178 |
| 2010/0070747 | A1* | 3/2010 | Iyigun | G06F 12/0862 |
| | | | | 713/2 |
| 2011/0066597 | A1 | 3/2011 | Mashtizadeh et al. | |
| 2011/0191522 | A1* | 8/2011 | Condict | G06F 12/123 |
| | | | | 711/103 |
| 2012/0233123 | A1* | 9/2012 | Shisheng | G06F 11/004 |
| | | | | 707/639 |
| 2012/0284234 | A1 | 11/2012 | Mashtizadeh et al. | |
| 2013/0031058 | A1 | 1/2013 | Adkins et al. | |
| 2013/0073813 | A1 | 3/2013 | Bacik | |
| 2013/0138867 | A1* | 5/2013 | Craft | G06F 12/0246 |
| | | | | 711/103 |
| 2013/0304713 | A1* | 11/2013 | Roy-Faderman | |
| | | | | G06F 16/2365 |
| | | | | 707/702 |
| 2013/0346557 | A1* | 12/2013 | Chang | G06F 9/45558 |
| | | | | 709/217 |
| 2014/0068197 | A1 | 3/2014 | Joshi et al. | |
| 2014/0095448 | A1* | 4/2014 | Marwah | G06F 16/27 |
| | | | | 707/667 |
| 2014/0188868 | A1* | 7/2014 | Hunter | G06F 3/06 |
| | | | | 707/736 |
| 2014/0207995 | A1* | 7/2014 | Benhase | G06F 12/0246 |
| | | | | 711/102 |
| 2014/0297780 | A1* | 10/2014 | Zhou | H04L 67/2847 |
| | | | | 709/216 |
| 2015/0046385 | A1* | 2/2015 | Shimizu | G06F 3/0653 |
| | | | | 706/52 |
| 2015/0058520 | A1 | 2/2015 | Armstrong et al. | |
| 2015/0058580 | A1* | 2/2015 | Lagar Cavilla | G06F 9/45558 |
| | | | | 711/149 |
| 2015/0161048 | A1* | 6/2015 | Patil | G06F 17/30132 |
| | | | | 711/141 |
| 2015/0355837 | A1* | 12/2015 | Bish | G06F 3/061 |
| | | | | 711/114 |
| 2015/0363319 | A1* | 12/2015 | Qi | G06F 3/0619 |
| | | | | 711/121 |
| 2015/0378892 | A1* | 12/2015 | Tajima | G06F 9/45558 |
| | | | | 711/118 |
| 2016/0011979 | A1* | 1/2016 | Islam | G06F 12/0871 |
| | | | | 711/102 |
| 2016/0041907 | A1* | 2/2016 | Jung | G06F 12/10 |
| | | | | 711/122 |
| 2016/0381176 | A1* | 12/2016 | Cherubini | H04L 67/327 |
| | | | | 709/219 |
| 2017/0083724 | A1* | 3/2017 | Chhabra | G06F 21/72 |
| 2018/0027006 | A1* | 1/2018 | Zimmermann | H04L 63/0245 |
| | | | | 726/11 |
| 2018/0089088 | A1* | 3/2018 | Jakowski | G06F 11/1469 |

OTHER PUBLICATIONS

Bradford, et al., "Live Wide-Area Migration of Virtual Machines Including Local Persistent State", In Proceedings of the 3rd international conference on Virtual execution environments, Jun. 13, 2007, 11 pages.

Piccioni, Dennis, "Opportunistic Locking and Read Caching on Microsoft Windows Networks", Retrieved on: Apr. 22, 2016, 8 pages. Available at: dataaccess.com/whitepapers/opportunlockingreadcaching.html.

PCT International Search Report and Written Opinion in PCT/US2017/039356, dated Sep. 25, 2017, 15 pages.

* cited by examiner

SYSTEMS AND METHODS FOR LIVE MIGRATION OF A VIRTUAL MACHINE BASED ON HEAT MAP AND ACCESS PATTERN

BACKGROUND

Virtual machine (VM) live migration is a technology that enables moving running VMs (or VMs that are being utilized by one or more client devices) between different hosts or nodes in a redundant array of independent (storage) nodes (RAIN) based architecture without service interruption, and with complete transaction integrity. During VM live migration, a VM's memory is migrated or moved to a different node over a network connection first, and then quickly suspends the VM on the original host or node and resumes use of the VM on the new node. It is often critical to keep the migration latency low in order to guarantee continuous service availability during the VM migration.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for live migration of VMs between different nodes. More specifically, the system and methods as disclosed herein, utilize a heat map and an access pattern to determine the fetching order of files and/or blocks from the cache of a host node for rebuilding the cache on a destination node. Additionally, the systems and methods as disclosed herein are able to persist the cache of a host node across a crash, allowing a destination node to fetch blocks and/or files from the cache on the host node after a crash instead of having to access the VM files and/or blocks from an original source. Accordingly, the systems and methods as disclosed herein decrease migration latency of the VM during live migration and free up network bandwidth during the live migration when compared to prior systems and methods that utilize just the heat map to determine the fetching order and/or that are not able to persist the cache across a crash.

One aspect of the disclosure is directed to a system for moving a VM that is running between different nodes. The system includes at least one processor and a memory. The memory encodes computer executable instruction that, when executed by the at least one processor, are operative to:
  receive an indication of a VM transfer from a host node;
  receive metadata from the host node;
  determine that the metadata is valid;
  in response to determining that the metadata is valid, analyze the heat map and analyze the access pattern;
  fetch files from a cache on the host node utilizing the file path; and
  rebuild at least a portion of the cache with the files.
The metadata includes a heat map, a file path to the host node, and an access pattern for the VM. The files are fetched based on the heat map in view of the access pattern. Further a first file with a first hit rate will be fetched before a second file with a second hit rate that is higher than the first hit rate based on the access pattern.

Another aspect of the disclosure is directed to a method for moving a VM that is running between different nodes. The method includes:
  receiving an indication of a VM transfer from a host node;
  receiving metadata from the host node, wherein the metadata includes a heat map, a file path to the host node, and an access pattern for the VM;
  determining that the metadata is valid;
  in response to the determining that the metadata is valid, analyzing the heat map and analyzing the access pattern;
  fetching blocks from a cache on the host node utilizing file path; and
  rebuilding at least a portion of the cache with the blocks.
The blocks are fetched based on the heat map and the access pattern. Further, a first block with a first hit rate is fetched before a second block with a second hit rate that is higher than the first hit rate based on the access pattern. Additionally, a third block with a third hit rate that is hot is not fetched based on the access pattern.

A further aspect of the disclosure is directed to a system for moving a VM that is running between different nodes. The system includes at least one processor and a memory. The memory encodes computer executable instruction that, when executed by the at least one processor, are operative to:
  receive an indication of a VM transfer from a host node;
  receive metadata from the host node, wherein the metadata includes a heat map, a file path to the host node, and an access pattern for the VM;
  determine if the metadata is valid;
  in response to a first determination that the metadata is invalid:
    fetch source files from an original source;
  in response to a second determination that the metadata is valid:
    analyze the heat map and analyze the access pattern,
    fetch cache files from a cache on the host node utilizing the file path; and
  rebuild at least a portion of the cache with fetched files.
Further, a fetching order of the cache files is based on the heat map and the access pattern. Additionally, a first cache file with a first hit rate will be fetched before a second cache file with a second hit rate that is higher than the first hit rate based on the access pattern.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
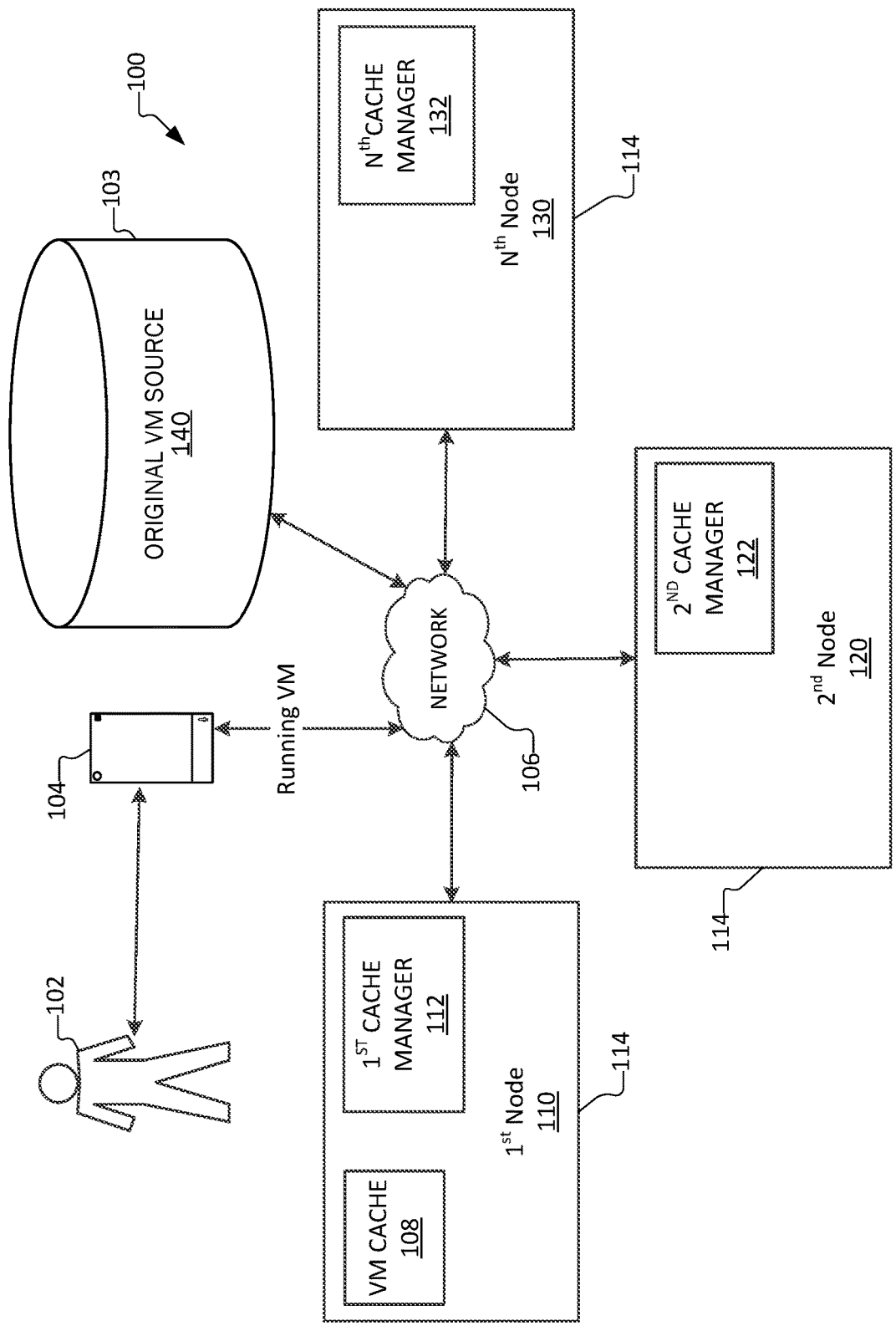
FIG. 1 is a schematic diagram illustrating use of a VM by a client computing device on a RAIN based architecture, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Virtual machine (VM) live migration is a technology that enables moving running VMs between different hosts or nodes in a RAIN based architecture without service interruption, and with complete transaction integrity. During VM live migration, the VM's memory is migrated or moved to the new (also referred to herein as a destination node) over a network connection first, and then quickly suspends the VM on the original or host node and resumes use of the VM on the new node. It is often critical to keep the migration latency low in order to guarantee continuous service availability during the VM migration.

Currently, in response to a VM live migration, a set of metadata from the cache on a host node is sent to a destination node. This metadata indicates files and/or blocks of the VM, a heat map of the files and/or block, and/or a file path to the host node. Based on this metadata, the destination node can fetch these blocks and files and populate or rebuild a local cache for the VM. Essentially, the content of the cache is migrated from the host node to the destination node. Alternatively, the destination node could retrieve the files and/or block from the original source of the files and/or blocks, which is typically from a non-volatile storage device or media. However, the fetching of data from the original source often increases latency hurting the performance of the VM. Further, these previously utilized systems and methods for live migration were not able to persist the cache of the host node over a crash of the host node. As such, upon a crash of the host node the entire cache would have to be rebuilt on the destination node utilizing the files and/or block from the original source.

By merely relying on the heat map, the destination node may fetch blocks or files that are hot but are not currently needed by a VM on the destination node increasing latency and hurting performance. Further, if the host node crashes, the entire caches on the destination node has to be rebuilt by fetching files and/or block from the original source increasing migration latency of the VM hurting the VM performance.

The systems and method as disclosed herein are directed to systems and methods for live migration of a VM between different nodes. The system and methods as disclosed herein, utilize a heat map in view of an access pattern to determine the fetching order of the files and/or blocks from the host node. Additionally, the systems and methods as disclosed herein are able to persist the cache of a host node across a crash, allowing the destination node to fetch blocks and/or files from the cache on the host node after a crash instead of having to access the VM files and/or blocks from an original source. Accordingly, the systems and methods as disclosed herein decrease migration latency of the VM during live migration and frees up network bandwidth during the live migration when compared to prior systems and methods that utilize just the heat map to determine the fetching order and/or that are not able to persist the cache across a crash.

The ability of the systems and methods described herein to decrease the migration latency and network bandwidth use improves the performance of the virtual machine, or increases the speed and/or improves the use of the virtual machine by the end user.

Figure 2:
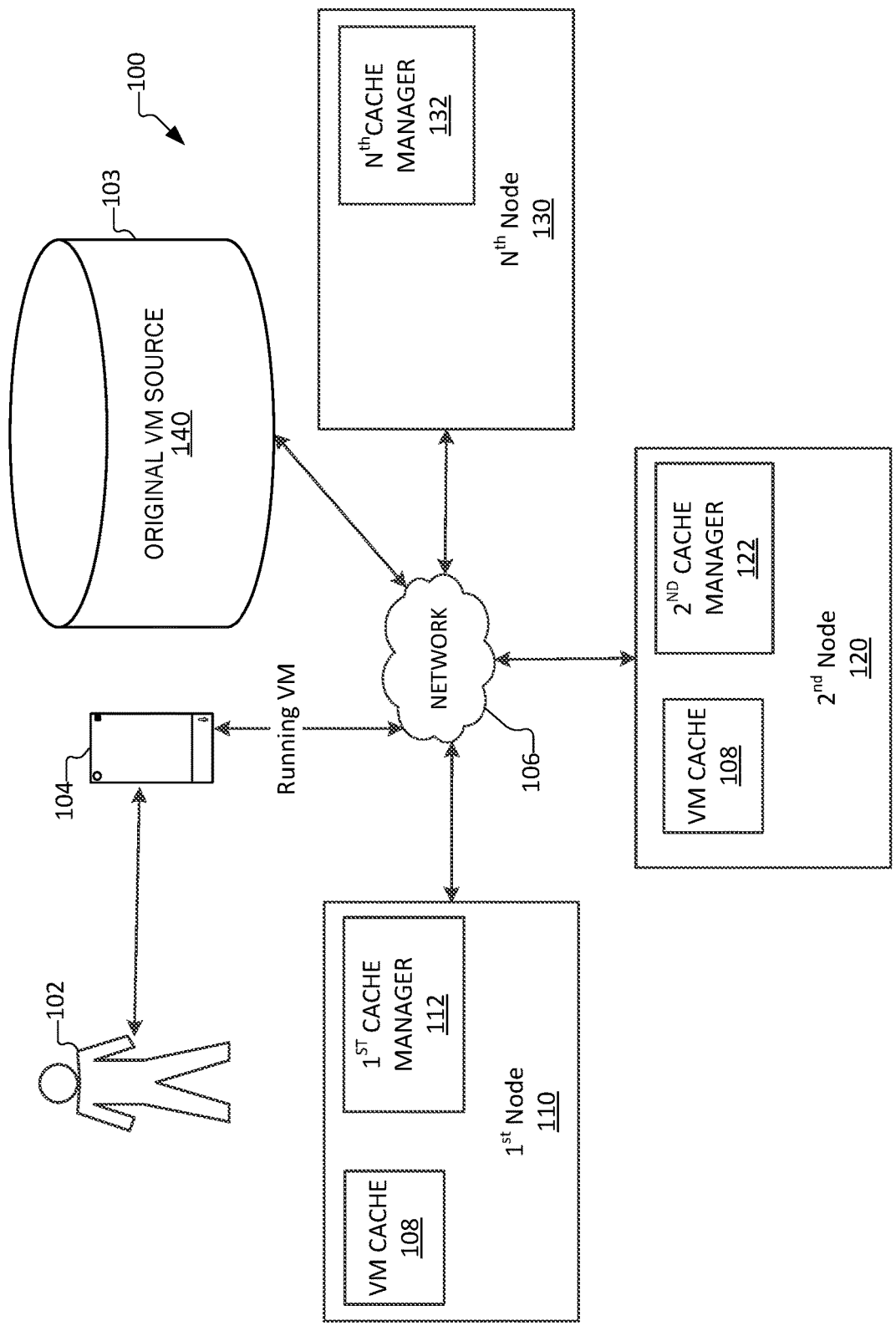
FIG. 2 is a simplified block diagram illustrating a live migration of the VM on the RAIN based architecture as shown in FIG. 1, in accordance with aspects of the disclosure.
Figure 3:
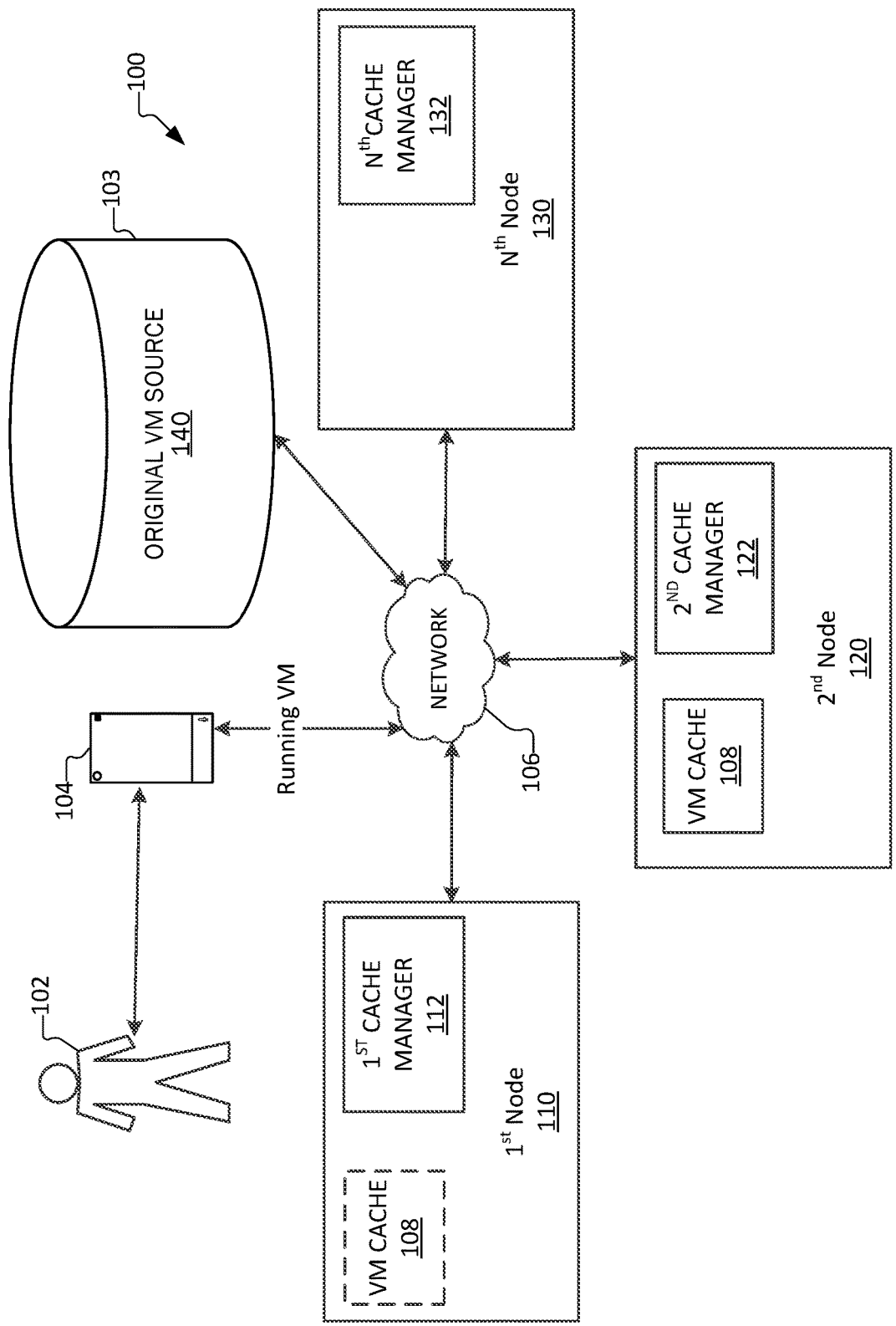
FIG. 3 is a simplified block diagram illustrating use of the VM by the client computing device from a different node on the RAIN based architecture during or after the live migration as shown in FIG. 2, in accordance with aspects of the disclosure.

FIGS. 1-3 illustrate use of a VM by client computing device 104 on a RAIN based architecture 100 during different stages of a live migration, in accordance with aspects of the disclosure. In a basic configuration, the client computing device 104 is a computer having both input elements and output elements. The client computing device 104 may be any suitable computing device for implementing the VM. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for running the VM may be utilized. The client computing device 104 is utilized by a user 102.

In some aspects, a node 114 of the RAIN based architecture 100 is implemented on a server computing device. The server computing device may transmit data for running the VM to and/or from the client computing device 104 through a network 106. In some aspects, the network 106 is a distributed computing network, such as the internet. In further aspects, a node 114 of the RAIN based architecture 100 is implemented on more than one server computing device, such as a plurality or network of server computing devices.

FIG. 1 illustrates the use of a VM by a client computing device 104 from a first node 110 in the RAIN based architecture 100, in accordance with aspects of the disclosure. The first node 110, as illustrated in the example provided in FIG. 1, is a host node that is hosting or running the VM being utilized by the client computing device 104. The first node 110 runs the VM by utilizing files and/or block stored in the VM cache 108 on the first node 110. The VM cache 108 is managed on the first node 110 by a first cache manager 112. In response to a desire to live transfer the VM to another node 114, the first cache manager 112 on the first node 110 sends an indication of the live transfer of the VM to a second node 120. Additionally, the first cache manager 112 on the first node 110 sends metadata to the second node 120. In some aspects, the first cache manager 112 sends the metadata with or as part of the indication of the live transfer to the second node 120. In alternative aspects, the first cache manager 112 sends the metadata to the second node 120 after sending the indication of live transfer of the VM to the second node 120

Accordingly, the second node 120 becomes a destination node because the second node 120 is the destination for the live transfer of the VM. FIG. 2 illustrates the live migration of the VM from the first node 110 (host node) to the second node 120 (destination node) on the RAIN based architecture 100, in accordance with aspects of the disclosure. The second node 120 receives the indication of the live transfer of the VM. The second node 120 also receives the metadata from the first node 110.

The second node 120 includes a second cache manager 122. The second cache manager 122 analyzes, reads, and/or opens the metadata from the first node 110. The second cache manager 122 determines if the metadata is valid. In some aspects, the second cache manager 122 determines that the metadata is valid when a generation number in the metadata matches the cache generation number on the first node 110. In these aspects, if second cache manager 122 determines that the generation number of the metadata does not match the cache generation number on the first node 110, the second cache manager 122 determines that the metadata is invalid.

If the metadata is determined to be invalid by the second cache manager 122, the second node 120 fetches files and/or blocks from the original source 140 of the VM. In some aspects, the original source 140 of the VM is stored on a non-volatile storage device or media. In some aspects, the original source 140 is a node 114. In further aspects, the original source 140 is a non-volatile storage device on one or more servers. In other aspects, the original source 140 is a non-volatile storage device in one or more libraries or repositories 103.

If the metadata is determined to be valid by the second cache manager 122, the second cache manager 122 on the second node 120 analyzes the metadata and/or then fetches files and/or blocks from the VM cache 108 on the host node, which is the first node 110 in this aspect, based on the analyzed metadata.

The metadata may be valid even after a crash on the host node if the second cache manager 122 is able to detect a content change while the host node is down. For example, if a file or block is modified by another node during the crash, the generation number is bumped to invalidate the cache maintained at the client end. In some aspects, the generation number is marked on the host cache prior to caching reads based on Oplock semantics. This Cache is persisted in the local flash on the host node. The host node will store a new generation number if the file or block has no generation number. Alternatively, in this aspect, the host node will use the generation number stored in the file or block. The host node starts caching, but prior to handling the first write, the generation number will be changed (updating the local cache on the first node 110 as well). Persisting the VM cache 108 across a crash helps to save on bandwidth and also prevents having to rebuild the cache all over again, which takes time. As such, the metadata is separated from the data in each file and/or block.

The metadata includes a file path to the host node, a heat map, and an access pattern for the VM. The file path provides a path to the cache manager on the destination node for reaching the VM cache 108 on a host node.

The heat map provides a historical hit rate for each file or block of the VM as utilized on the host node. Blocks or files that have a significant amount of hits are considered hot, while blocks or files that have very few hits are considered cold. For example, a file or block with 5 or less hits may be considered cold. However, any suitable hit threshold may be utilized for determining if a block and/or file is hot or cold, such as 20 hits, 15 hits, 10 hits, 8 hits, 7 hits, 6 hits, 5 hits, 4 hits, 3 s, 2 hits, or 1 hit or less, Each time a file or block was accessed or used by the client computing device 104 utilizing the VM, the block or file is given a hit, these hits are monitored and summed by the host node to generate the provided heat map. The heat map may order the files and/or block based on the number of hits. As such, in some aspects, the heat map assigns an hit priority to each of the files and/or blocks. Accordingly, the heat map will give a higher hit priority to files and/or block with higher hit rates and give a lower hit priority to files and/or block with lower hit rates. Previously utilized systems or methods for live migration of a VM often utilized the priority list of the heat map as a fetching order.

The file and/or block as utilized herein may be one or more applications, one or more documents of an application, and/or any other component utilized by the VM. A document as utilized herein is a generic term for any saved component of an application, such as a saved word document for a word processing application, a saved sheet for a spreadsheet application, a saved slide deck for a presentation application, and etc. While a file transfer or a block transfer represent two different known ways for transferring data, the systems and methods as utilized herein may utilize a file transfer and/or a block transfer for transferring data to the destination node.

The access pattern provides a list of what files and/or blocks are currently being utilized by the VM running on the client computing device(s) 104. Additionally, the access pattern provides an ordered list of what files and/or blocks are likely to be utilized next by the VM running on the client computing device(s) 104 based on the currently utilized files or blocks. As such, in some aspects, the access pattern assigns an access priority to each of the files and/or blocks. For example, if a VM is currently accessing a word processing application, it is more likely that saved word documents of the word processing application are going to be accessed prior to a spreadsheet application and/or saved sheets (or documents) for that spreadsheet application. In other words, the access pattern provides a list of the files and/or blocks in current use or currently being accessed by the VM and an ordered list of which blocks and/or files are likely to be accessed next by the VM based on the currently used files and/or blocks. In further aspects, the access pattern may utilize past use or access patterns of the files or blocks on the host node to help determine what blocks or files are likely to be utilized next by the VM. For example, if the VM while running on the host node accessed saved spreadsheet A 90% of the time and only accessed spreadsheet B 60% of time while accessing a spreadsheet application, this access pattern can be utilized to give spreadsheet A a higher access priority than spreadsheet B on the access list when the spreadsheet application is utilized by the VM during a live transfer on the destination node. The access list is independent of the heat map. For example, the spreadsheet application, spreadsheet A, and spreadsheet B as utilized in the prior example may all have very low hit rates, but since the spreadsheet application is currently in use by the VM machine on the destination node, spreadsheet A and spreadsheet B are assigned very high access priorities on the access pattern.

The second cache manager 122 fetches the files and/or blocks on the VM cache 108 on the first node 110 by utilizing or via the provided file path to the host node, which is the first node 110 in this aspect. The second cache manager 122 determines a fetching order for files and/or blocks on the VM cache 108 on the first node 110 based on the heat map in view of the access pattern. Accordingly, the second cache manager 122 does not blindly fetch files and/or blocks in the order of the highest hit rate, but instead utilizes both the heat map and access pattern to determine the fetching order for the blocks and/or files. In some aspects, the fetching order is determined based on an analysis of the assigned hit priorities by the heat map and the assigned access priorities by the access pattern. Additionally, in further aspects, the second cache manager 122 fetches the files or blocks from the VM cache 108 stored on the first node 110 on an as needed basis. As such, in these aspects, the second cache manager 122 may not fetch all of the blocks and/or files on the VM cache 108 stored on the first node 110. In alternative aspects, the second cache manager 122 may fetch all of the blocks and/or files on the VM cache 108 stored on the first node 110.

For example, a first file or block with a first hit rate may be fetched before a second file or block with a second hit rate that is higher than the first hit rate based on the access pattern. In this example, the first file or block may be a document for a first application that is currently running on the VM and the second file may be a second application that is not currently running on the VM. As such, second cache manager 122 recognizes that the VM is more likely to access a saved document for the running first application than the VM is to open a different application. In another example, a file or block with a hit rate that is hot is not fetched at all by the second cache manager 122 based on the access pattern. In this example, the file or block may been access a hundred times, but based on the access pattern, the second cache manager 122 will recognize that this hot file or block has not been accessed or used by the client computing device 104 on the first node 110 in over two years or another significant amount of time. As such, the second cache manager 122 will not fetch this hot block or file. Accordingly, the cache manager of a destination node will determine a fetching order of the files and/or block based on both the heat map and the access pattern received in the metadata from the first node 110.

The use of the access pattern in addition to the heat map allows the destination node to fetch the most relevant files and/or nodes first, while saving less relevant or less needed nodes for later fetching or never fetching them at all. This directed fetching order decreases live migration latency and improves the VM performance when compared to prior live migration systems that did not utilized the access pattern. Additionally, this directed fetching allows the cache manager of the destination node to use less bandwidth when compared to prior live migration systems that did not utilized the access pattern, since all of the host files and/or blocks are not fetched right away or fetch at all.

The cache manager on the destination node rebuilds a least a portion of the VM cache 108 on the destination node. Once at least a portion of the VM cache 108 has been rebuilt or populated on the destination node, the cache manager on the destination node may suspend use of the VM cache 108 on the host node. For example, FIG. 3 illustrates use of the VM cache 108 on the second node 120 after the VM cache 108 on the first node 110 has been suspended. In this aspect, the second cache manager 122 rebuilds a least a portion of the VM cache 108 on the second node 120. Once at least a portion of the VM cache 108 has been rebuilt or populated on the second node 120, the second cache manager 122 may suspend use of the VM cache 108 on the first node 110.

While FIGS. 1-3 illustrate a live migration of VM from the first node 110 to the second node 120, the VM may be transferred from any host node to any other node ($N^{th}$ node 130) with its own cache manager ($N^{th}$ cache manager 132) on the RAIN based architecture 100. As such, the VM may be live migrated from the second node 120 to another $N^{th}$ node 130 on the RAIN based architecture 100. In further embodiments, additional VMs may be live migrated between the first node 110 and the second node 120 or between any nodes 114 on the RAIN based architecture 100 as illustrated in FIGS. 1-3.

Figure 4:
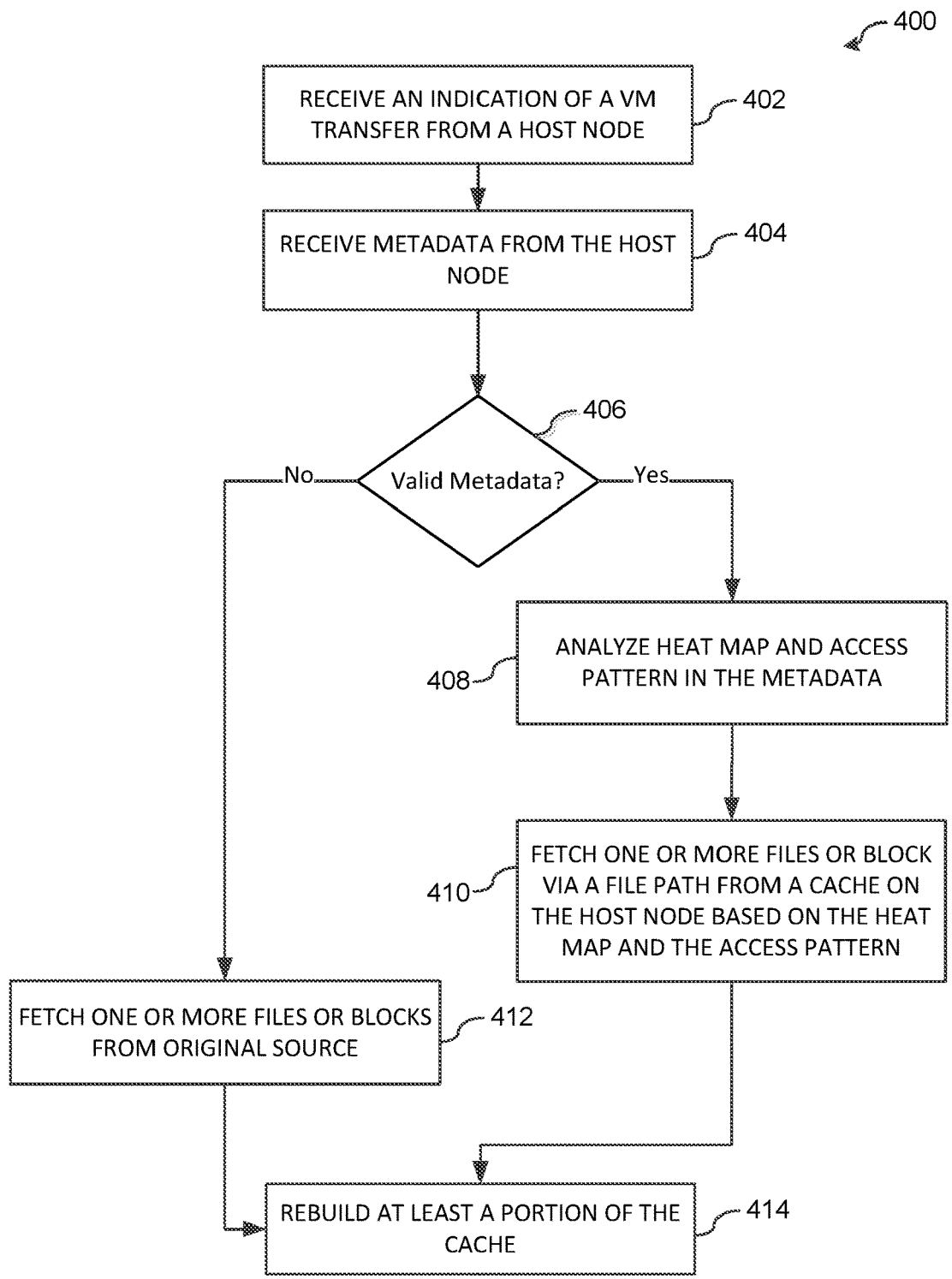
FIG. 4 is a flow diagram illustrating a method for live migration of a virtual machine between different nodes, in accordance with aspects of the disclosure.

FIG. 4 illustrates a flow diagram conceptually illustrating an example of a method 400 for live migrating a virtual machine (VM) between different nodes. In some aspects, method 400 is performed by a node 114 of the RAIN based architecture 100 as described above. Method 400 provides a method for live migrating a VM that determines a fetching order for files or blocks based on a received heat map and an access pattern. Further, method 400 provides a method for live migrating a VM that is able to persist a VM cache of a host node across a crash, allowing the destination node to fetch blocks and/or files from the VM cache on the host node after a crash instead of having to access the files and/or blocks from an original source. Accordingly, method 400 decreases latency of the VM and uses less network bandwidth during live migration between nodes when compared to prior methods that utilize just the heat map to determine the fetching order and/or that are not able to persist the cache across a crash.

At operation 402, a VM transfer indication is received from a host node. At operation 404, metadata from the host node is received. As discussed above, the metadata includes a heat map, a file path to the host node, and an access pattern for the VM. As also discussed above, the metadata may be part of the transfer indication or may be received after the transfer indication.

At operation 406 the metadata is evaluated or analyzed to determine if the metadata is valid. If operation 406 determines that the metadata is valid, operation 408 is performed. If operation 406 determines that the metadata is invalid, operation 412 is performed. In some aspects, operation 406 determines that the metadata is valid when a generation number in the metadata matches the cache generation number on the host node. In these aspects, if operation 406 determines that the generation number of the metadata does not match the cache generation number on the host node, operation 406 determines that the metadata is invalid.

The metadata may be valid even after a crash on the host node if operation 406 is able to detect a content change while the host node is down. For example, if a file or block is modified by another node during the crash, the generation number is bumped to invalidate the cache maintained at the client end. In some aspects, the generation number is marked on the host cache prior to caching reads based on Oplock semantics (or other similar programs). This host cache is persisted in the local flash on the host node. The host node will store a new generation number if the file or block has no generation number. Alternatively, in this aspect, the host node will use the generation number stored in the file or block. The host node starts caching, but prior to handling the first write, the generation number will be changed (updating the local cache on the first node as well). Persisting the VM cache across a crash helps to save on bandwidth and also prevents having to rebuild the cache all over again on the destination, which takes time. As such, the metadata is separated from the data in each file and/or block.

At operation 412 files or blocks for the VM are fetched from an original source. In some aspects, the original source of the VM is stored on a non-volatile storage device. In some aspects, blocks or files on the original source are stored in a non-volatile storage device on one or more servers. In other aspects, the blocks and/or files on the original source 140 are stored on a non-volatile storage device in one or more libraries or repositories. The block or file may be one or more of an application, one or more documents of an application, or any other suitable component that may be accessed by the VM.

The heat map and the access pattern are analyzed during operation 408. A fetching order is determined based on the analysis of the access pattern and the heat map at operation 408. In some aspects, the fetching order is determined based on an analysis of the assigned hit priorities by the heat map and the assigned access priorities by the access pattern. The fetching order and the access pattern may be updated at operation 408 based on new access requests for files or blocks by the running VM. For example, the access pattern may be updated in response to the VM accessing a specific file or block. The update of the access pattern may in turn cause the fetching order to be updated accordingly.

The heat map provides a historical hit rate for each file or block of the VM from the host node. Blocks or files that have a significant amount of hits are considered hot, while blocks or files that have very few hits are considered cold. As such, in some aspects, the heat map assigns an hit priority to each of or to a portion of the files and/or blocks. Accordingly, the heat map gives a higher hit priority to files and/or blocks with higher hit rates and gives a lower hit priority to files and/or block with lower hit rates.

The access pattern provides a list of the files and/or blocks in current use or currently being accessed by the VM and an ordered list of which blocks and/or files are likely to accessed next by the VM based on the currently accessed files and/or blocks. In further aspects, the access pattern may utilize past access patterns of the files or blocks on the host node to help determine what blocks or files are likely to be accessed next by the VM. As such, in some aspects, the access pattern assigns an access priority to each of or to a portion of the files and/or blocks.

At operation 410 files or blocks are fetched from a cache on the host node utilizing the file path. Further, at operation 410 the blocks are fetched based on the heat map in view of the access pattern, or in other words, based on the determined fetch order. Because the blocks or files are fetched based on the access path in addition to the heat map, in some aspects, operation 410 may fetch a first block with a first hit rate before fetching a second block with a second hit rate that is higher than the first hit rate based on the access pattern. For example, in this aspect, the first file or block may be a document for a first application that is currently being accessed by the VM and the second file or block is a second application that is not currently being accessed by the VM. In additional aspects, because the blocks or files are fetched based on the access path in addition to the heat map, operation 410 may not fetch a third block with a third hit rate that is hot based on the access pattern. In some aspects, operation 410 fetches nodes and/or blocks on as needed basis. As such, in some aspects, the operation 410 may not fetch all of the blocks or files from the host cache.

At least a portion of the cache is rebuilt or populated with the fetched blocks or files at operation 414. Further, at operation 414, the VM on the host node may be suspended.

While the system and method described above focus on VM, the proposed heat map and access pattern transfer may be utilized with other applications, such as structured query language (SQL). In case of VM, it is assumed that VM service will transfer the cache heat map and access pattern to the new machine. For other applications, the application may transfer the cache hit map and access pattern (such as using two input/output controls: one to read heat map and access pattern on the source, and another to set the heat map and the access pattern on the destination). In alternative aspects, where fail-over is managed by a cluster, the cluster may learn what files belong to that application and then move the heat map and access pattern to the new node as a part of the fail-over. In further aspects, the additional transfer mechanisms for the heat map and the access pattern, as described above, may also be utilized by the VM.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
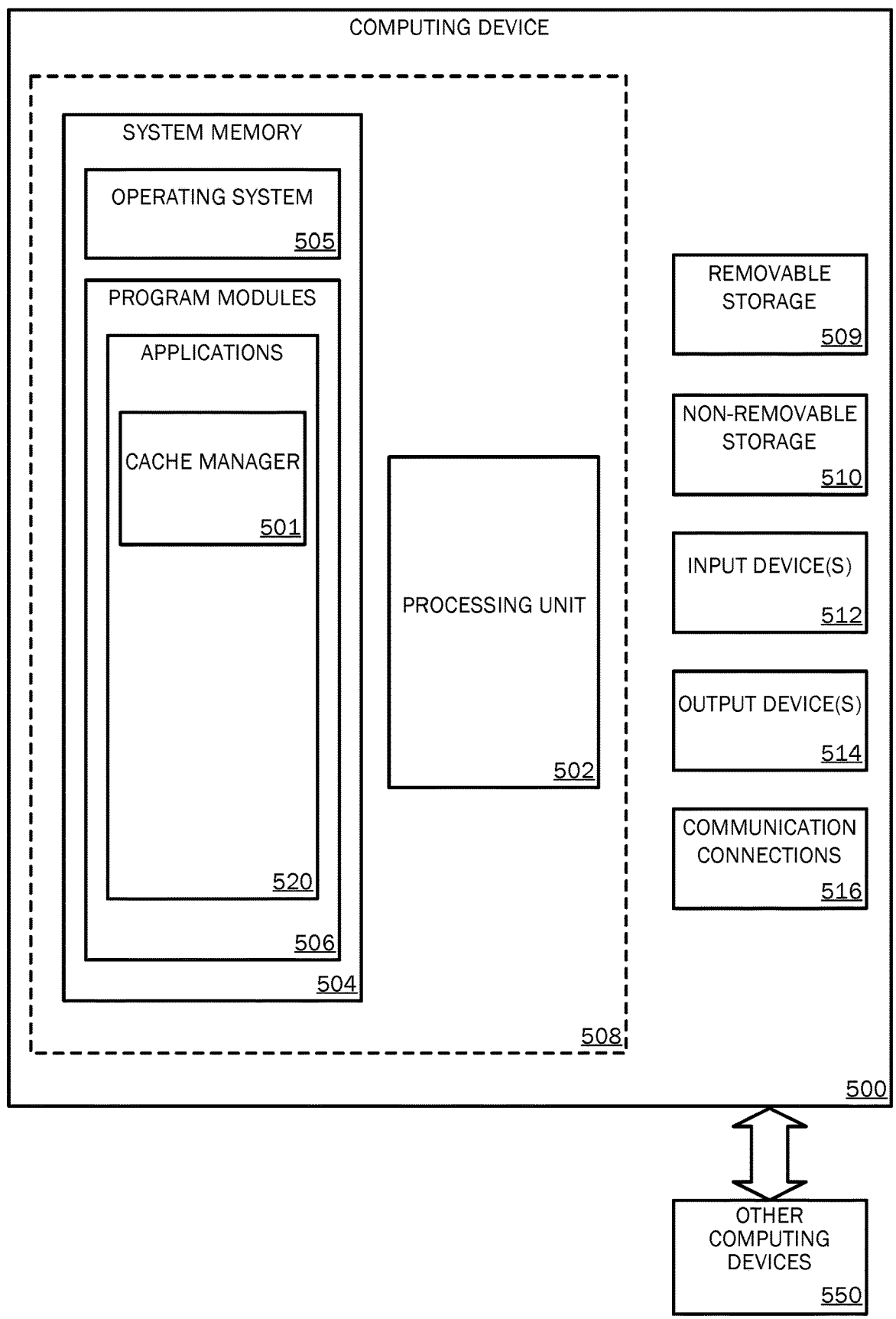
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the cache manager 501 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the cache manager 501 that can be executed to employ method 400 for VM live migration as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the cache manager 501) may perform processes including, but not limited to, performing method 400 as described herein. For example, the processing unit 502 may implement the cache manager 501. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the cache manager 501 transfers of one or more of the above referenced applications for a VM during a live migration.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
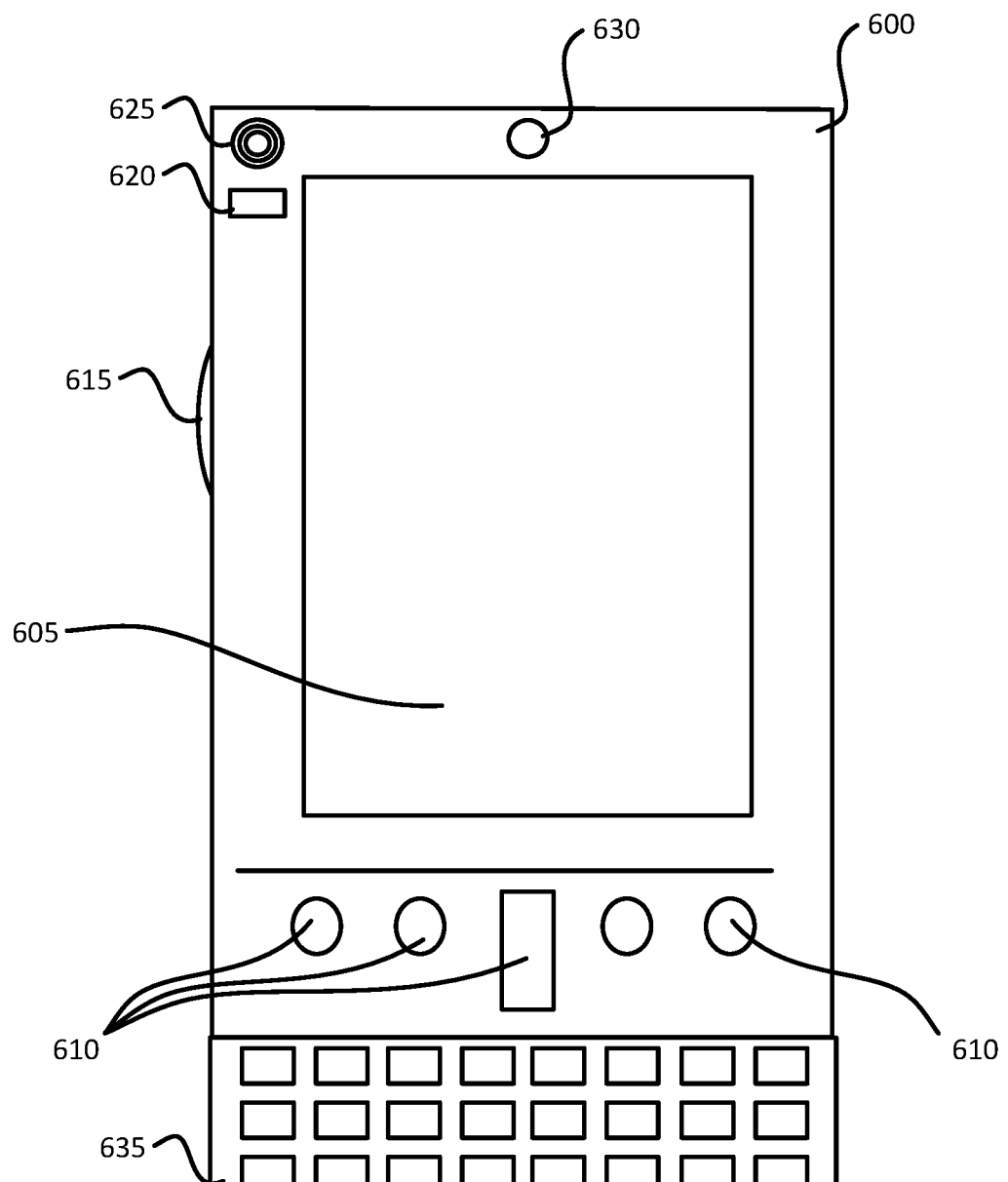
FIG. 6A is a simplified block diagram of a mobile computing device with which various aspects of the disclosure may be practiced.
Figure 6B:
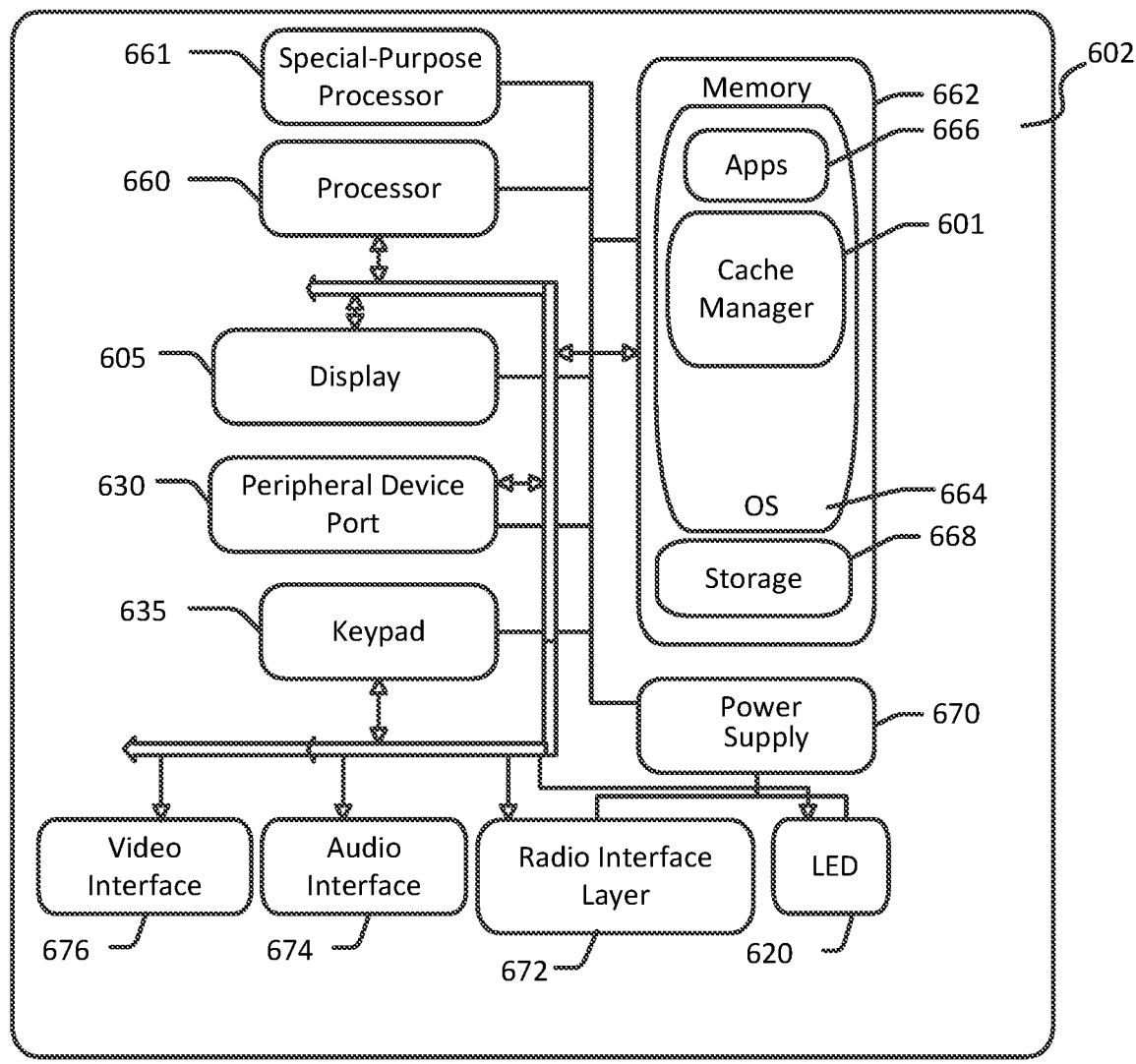
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the cache manager 601 run on or in association with the operating system 664. Examples of the application programs include phone dialer programs, e-mail programs, personal information management (PIM) programs, word processing programs, spreadsheet programs, Internet browser programs, messaging programs, and so forth. In some aspects, the cache manager 601 transfers these other programs during a live migration. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
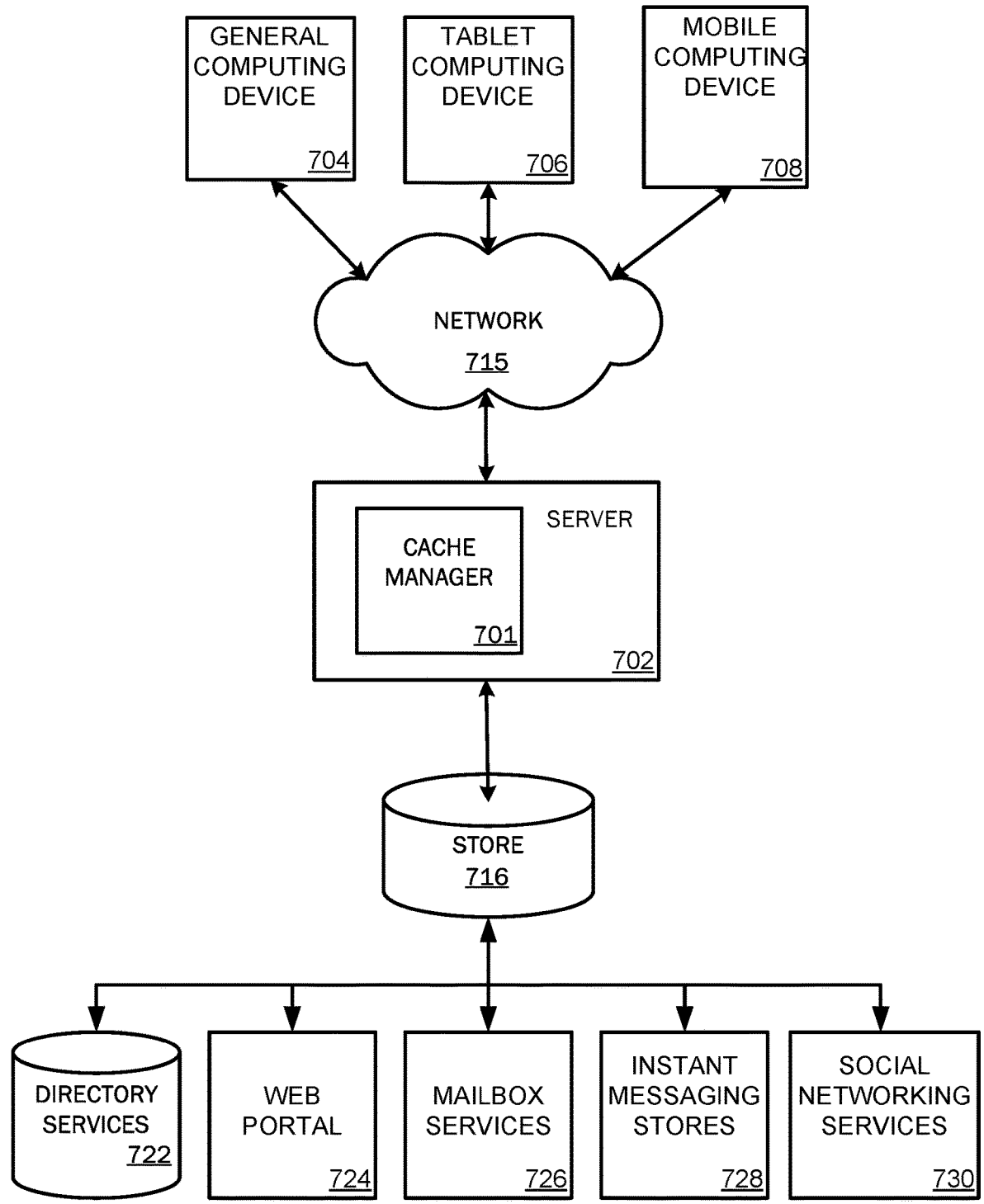
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. In some aspects, the server 702 is configured to implement cache manager 601, via the network 715 as illustrated in FIG. 7. Any of these embodiments of the computing devices 704 may obtain content from the store 716 to be either pre-processed at a graphic-originating system, or post-processed at a receiving computing system.

Figure 8:
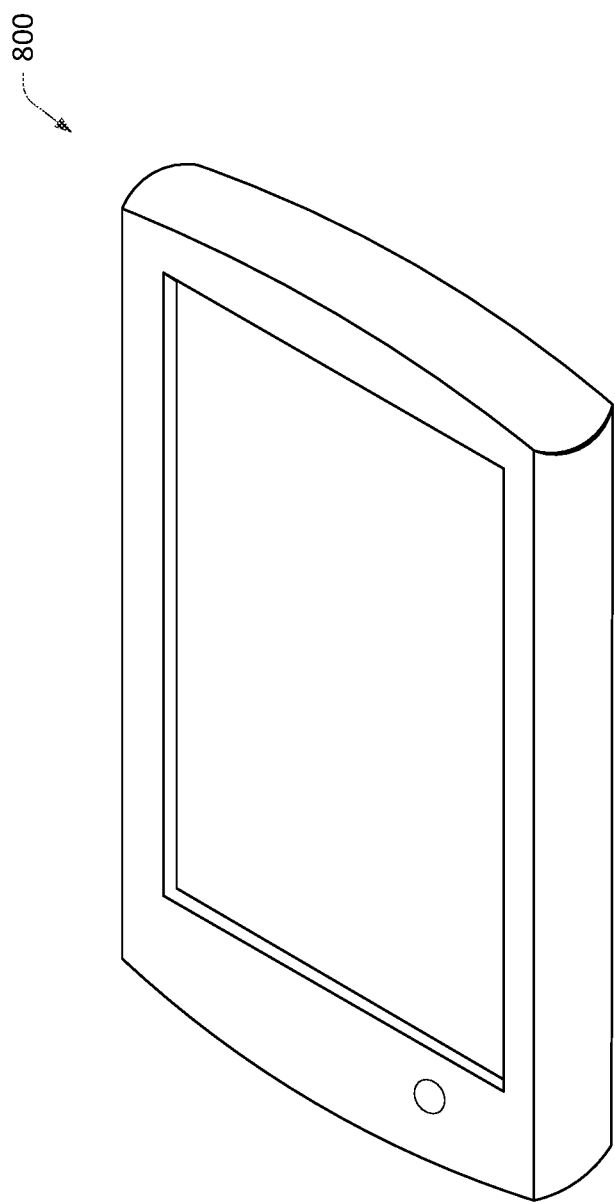
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In some aspects, a system for moving a VM that is running between different nodes is provided. The system includes at least one processor and a memory. The memory encodes computer executable instruction that, when executed by the at least one processor, are operative to:
  receive an indication of a VM transfer from a host node;
  receive metadata from the host node;
  determine that the metadata is valid;
  in response to determining that the metadata is valid, analyze the heat map and analyze the access pattern;
  fetch files from a cache on the host node utilizing the file path; and rebuild at least a portion of the cache with the files. The metadata includes a heat map, a file path to the host node, and an access pattern for the VM. The files are fetched based on the heat map in view of the access pattern. Further a first file with a first hit rate will be fetched before a second file with a second hit rate that is higher than the first hit rate based on the access pattern. In some aspects, a third file with a third hit rate that is hot is not fetched based on the access pattern. In other aspects, a file is an application or a document of the application. In additional aspects, the access pattern determines and assigns an access priority to each of the files based on current file use of the VM. In some aspects, the first file is a document for a first application that is currently running on the VM and the second file is a second application that is not currently running on the VM. The heat map may provide a historical hit rate for each file of the VM from the host node and assigns a hit priority to each of the files based on the historical hit rate. In other aspects a third file with a cold hit rate may be fetched while a fourth file with a hot hit rate is not fetched. The cache may be persisted and may be accessed over a crash of the host node utilizing a generation number stored in the metadata. In these aspects, the metadata is valid when the generation number matches a cache generation number. In further aspects, the cache is never fully rebuilt. The system may be a server and/or a destination node. In some aspects, a file is an application and the application is:

a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
a device control application;
a web interface application;
an exchange application; and/or
a calendaring application.

In other aspects a method for moving a VM that is running between different nodes is disclosed. The method includes:

receiving an indication of a VM transfer from a host node;
receiving metadata from the host node, wherein the metadata includes a heat map, a file path to the host node, and an access pattern for the VM;
determining that the metadata is valid;
in response to the determining that the metadata is valid, analyzing the heat map and analyzing the access pattern;
fetching blocks from a cache on the host node utilizing file path; and
rebuilding at least a portion of the cache with the blocks.

The blocks are fetched based on the heat map and the access pattern. Further, a first block with a first hit rate is fetched before a second block with a second hit rate that is higher than the first hit rate based on the access pattern. Additionally, a third block with a third hit rate that is hot is not fetched based on the access pattern. In some aspects, a block is an application, a document of the application, and/or a file. The access pattern may determine and may assign an access priority to each of the blocks based on current file use of the VM. The heat map may provide a historical hit rate for each block of the VM from the host node and assigns a hit priority to each of the blocks based on the historical hit rate. In other aspects, a fourth block with a cold hit rate is fetched while a fifth block with a hot hit rate is not fetched. The cache may be persisted and accessed over a crash of the host node utilizing a generation number stored in the metadata. The metadata may be valid when the generation number of the metadata matches a cache generation number.

In further aspects, a system for moving a VM that is running between different nodes is disclosed. The system includes at least one processor and a memory. The memory encodes computer executable instruction that, when executed by the at least one processor, are operative to:

receive an indication of a VM transfer from a host node;
receive metadata from the host node, wherein the metadata includes a heat map, a file path to the host node, and an access pattern for the VM;
determine if the metadata is valid;
in response to a first determination that the metadata is invalid:
fetch source files from an original source;
in response to a second determination that the metadata is valid:
analyze the heat map and analyze the access pattern,
fetch cache files from a cache on the host node utilizing the file path; and
rebuild at least a portion of the cache with fetched files.

Further, a fetching order of the cache files is based on the heat map and the access pattern. Additionally, a first cache file with a first hit rate will be fetched before a second cache file with a second hit rate that is higher than the first hit rate based on the access pattern. The fetching order may be determined based on hit priorities assigned to each file by the heat map and based on access priorities assigned to each of the files by the access pattern. The cache may be persisted and accessed over a crash of the host node utilizing a generation number stored in the metadata. The metadata may be valid when the generation number matches a cache generation number.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for live migration of a virtual machine (VM) from a host node to a destination node, the system comprising:
   at least one processor; and
   a memory for storing and encoding computer executable instructions that, when executed by the at least one processor is operative to:
      receive, at the destination node, an indication of a VM transfer from the host node comprising a heat map and an access pattern for the VM;
      generate, based on the heat map and the access pattern, a fetching order to fetch at least a part of the cache of the VM;
      cache, at the destination node, at least a first file with a first hit rate and a second file with a second hit rate according to the fetching order, wherein the second hit rate is higher than the first hit rate, and wherein the first file is cached before the second file based on the access pattern; and
      resume execution of the VM based on the cache at the destination node.

2. The system of claim 1, wherein a third file with a third hit rate that is hot is not fetched based on the access pattern.

3. The system of claim 1, wherein a file is an application or a document of the application.

4. The system of claim 1, wherein the access pattern determines and assigns an access priority to each of the files based on current file use of the VM.

5. The system of claim 1, wherein the first file is a document for a first application that is currently running on the VM and the second file is a second application that is not currently running on the VM.

6. The system of claim 1, wherein the heat map provides a historical hit rate for each file of the VM from the host node and assigns a hit priority to each of the files based on the historical hit rate.

7. The system of claim 1, wherein a third file with a cold hit rate is fetched while a fourth file with a hot hit rate is not fetched.

8. The system of claim 1, wherein:
   the cache of the VM is persisted at the host node over a crash of the host node using a cache generation number;
   when it is determined that the cache at the host node is valid based on a generation number received in the indication of the VM transfer and the cache generation number of the host node, caching the first file and the second file from the host node; and
   when the cache of the host node is not valid, caching the first file and the second file from an original source of the VM.

9. The system of claim 8, wherein determining that the cache is valid further comprises comparing the received generation number and the cache generation number to determine they are the same.

10. The system of claim 1, wherein the cache is never fully rebuilt.

11. The system of claim 1, wherein a file is an application, and wherein the application is at least one of:
   a digital assistant application;
   a voice recognition application;
   an email application;
   a social networking application;
   a collaboration application;
   an enterprise management application;
   a messaging application;
   a word processing application;
   a spreadsheet application;
   a database application;
   a presentation application;
   a contacts application;
   a gaming application;
   an e-commerce application;
   an e-business application;
   a transactional application;
   a device control application;
   a web interface application;
   an exchange application; or
   a calendaring application.

12. A method for live migration of a virtual machine (VM) between different nodes, the method comprising:
   receiving, at a destination node, an indication of a VM transfer from a host node, the indication comprising metadata that comprises a heat map, a file path to the host node, and an access pattern for the VM;
   determining that the metadata is valid when the generation number of the metadata matches a generation number associated with the host node;
   in response to the determining that the metadata is valid, fetching, by the destination node using the file path to the host node, blocks from a cache for the VM on the host node,
   wherein the blocks are fetched based on the heat map and the access pattern, and
   wherein a first block with a first hit rate is fetched from the cache by the destination node before a second block with a second hit rate that is higher than the first hit rate based on the access pattern, and
   wherein a third block with a third hit rate that is higher than the second hit rate is not fetched from the cache by the destination node based on the access pattern; and
   rebuilding at least a portion of the cache based on the fetched blocks.

13. The method of claim 12, wherein a block is one or more of an application, a document of the application, or a file.

14. The method of claim 12, wherein the access pattern determines and assigns an access priority to each of the blocks based on current file use of the VM.

15. The method of claim 14, wherein the heat map provides a historical hit rate for each block of the VM from the host node and assigns a hit priority to each of the blocks based on the historical hit rate.

16. The method of claim 12, wherein a fourth block with a cold hit rate is fetched while a fifth block with a hot hit rate is not fetched.

17. The method of claim 12, wherein the cache of the VM is persisted at the host node over a crash of the host node, and wherein the blocks are fetched from the host node after the crash.

18. A system for live migration of a virtual machine (VM) between different nodes, the system comprising:
   at least one processor; and
   a memory for storing and encoding computer executable instructions that, when executed by the at least one processor is operative to:
      receive, at a destination node, metadata associated with a VM transfer from a host node, wherein the metadata includes a heat map for a cache on the host node of the VM, a file path to the host node, and an access pattern for the VM;

evaluate whether the content at an original source associated with the cache changed to determine if the metadata is valid;

based on determining that the metadata is valid after the host node was down, fetch, by the destination node based on the heat map and the access pattern, a first cache file and a second cache file from the cache on the host node utilizing the file path to the host node, wherein the first cache file with a first hit rate will be is fetched from the cache before the second cache file with a second hit rate that is higher than the first hit rate based on the access pattern; and generate, at the destination node, a new cache for the VM based on at least the first cache file and the second cache file.

19. The system of claim 18, wherein an order of fetching cache files is determined based on hit priorities assigned to each file by the heat map and access priorities assigned to each of the files by the access pattern.

20. The system of claim 18, wherein the cache of the VM is persisted at the host node utilizing a cache generation number, and wherein determining whether the metadata is valid comprises evaluating a generation number of the metadata and the cache generation number.

* * * * *